Figure 1:
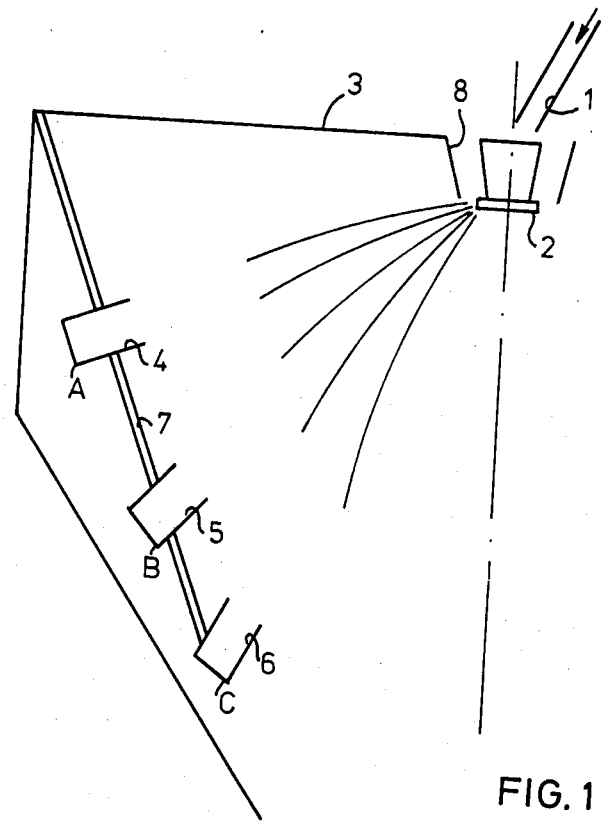

United States Patent [19]

de Ruvo et al.

[11] 4,288,317

[45] Sep. 8, 1981

[54] METHOD AND A SYSTEM FOR SEPARATING AN AQUEOUS SUSPENSION CONTAINING FIBROUS PARTICLES INTO FRACTIONS OF DIFFERENT AVERAGE CHARACTERISTICS

[75] Inventors: Alfonso de Ruvo, Stockholm; Bo Norman, Johanneshov, both of Sweden; Geoffrey G. Duffy, Aukland; Klaus Moller, Hamilton, both of New Zealand; Karl E. Hansen, Kokkedal, Denmark; Karsten S. Felsvang, Allerod, Denmark; Erik Liborius, Charlottenlund, Denmark

[73] Assignee: A/S Niro Atomizer, Søborg, Denmark

[21] Appl. No.: 38,045

[22] Filed: May 11, 1979

Related U.S. Application Data

[63] Continuation-in-part of Ser. No. 872,714, Jan. 26, 1978, abandoned, which is a continuation of Ser. No. 708,441, Jul. 23, 1976, abandoned.

[30] Foreign Application Priority Data

Jul. 29, 1975 [SE] Sweden ............................... 7508592

[51] Int. Cl.$^3$ ............................................ B07B 7/083
[52] U.S. Cl. ................................ 209/139 A; 209/142; 209/148; 209/642
[58] Field of Search ............ 209/638, 639, 642, 139 A, 209/142, 148, 144, 155

[56] References Cited

U.S. PATENT DOCUMENTS

| | | | |
|---|---|---|---|
| 472,682 | 4/1892 | Pape et al. | 209/148 X |
| 1,358,375 | 11/1920 | Koch | 209/145 |
| 1,517,509 | 12/1924 | Hokanson | 209/148 X |
| 2,331,850 | 10/1943 | Smith | 209/639 |
| 3,340,138 | 9/1967 | Braun et al. | 162/55 X |
| 3,670,886 | 6/1972 | Hosokawa et al. | 209/139 A |

FOREIGN PATENT DOCUMENTS 270066 5/1927 United Kingdom ................ 209/638

*Primary Examiner*—Ralph J. Hill
*Attorney, Agent, or Firm*—Sughrue, Mion, Zinn, Macpeak & Seas

[57] ABSTRACT

A method and system for separating an aqueous suspension containing fibrous particles into fractions of different average characteristics. The suspension to be separated is supplied to a separator disc rotating in a horizontal plane in the upper part of a chamber, in which collecting means are arranged in different zones to receive material dispersed from the disc. The method and system are effective for the separation of paper pulp suspensions such as groundwood pulp, chemical pulp, sediment or waste paper pulp into fractions of different fibre size and for the cleaning of paper pulp suspensions for impurity particles such as sand, shives and splinters. Another field of application is the separation of mineral wool suspensions into fractions consisting mainly of fibrous and spherical particles, respectively.

17 Claims, 14 Drawing Figures

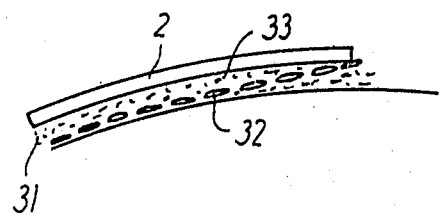
FIG. 2A
FIG. 4
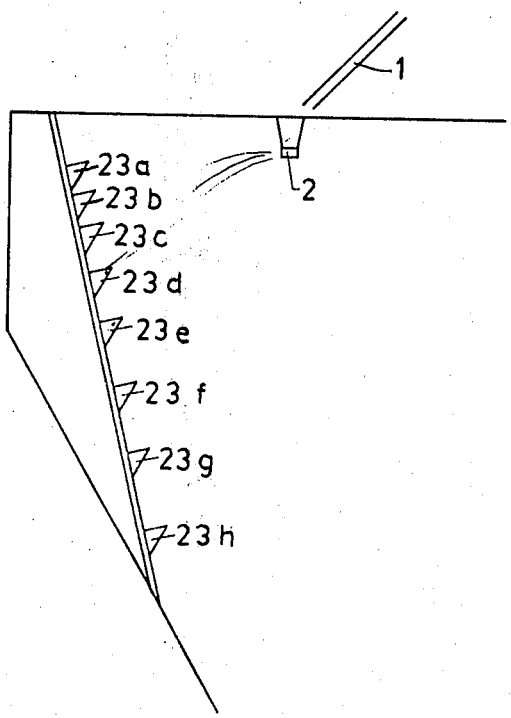

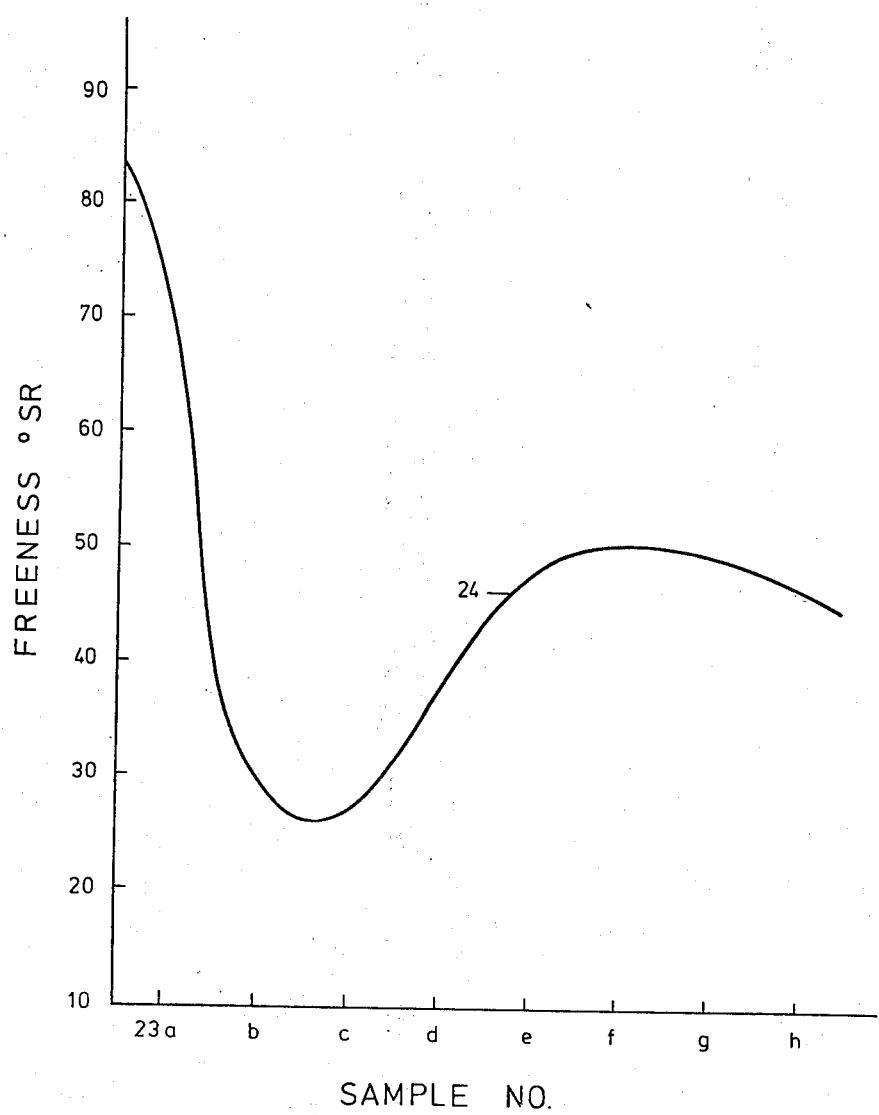

METHOD AND A SYSTEM FOR SEPARATING AN AQUEOUS SUSPENSION CONTAINING FIBROUS PARTICLES INTO FRACTIONS OF DIFFERENT AVERAGE CHARACTERISTICS

This application is a continuation-in-part of our copending application Ser. No. 872,714, filed Jan. 26, 1978, now abandoned which is a continuation of our prior application Ser. No. 708,441, filed July 23, 1976 and now abandoned.

The present invention relates to a method for separating an aqueous suspension containing fibrous particles into fractions of different average characteristics.

Whereas the invention is generally applicable and may be of interest for the separation of any kind of aqueous suspension containing fibrous particles into fractions of different average characteristics, such as particle size, shape mass, density or concentration, it is of particular interest for the separation of paper pulp suspensions.

BACKGROUND OF THE INVENTION

An increasing interest has been shown in recent years in the fractionation of paper pulp fibres according to size and shape of the fibres in aqueous suspension. By fractionation of groundwood pulp, for example, different grades of pulp can be obtained to meet the needs of various paper grades or paper machinery. Moreover, fractionation can enable a more efficient and more economic treatment of one fraction for enhancement of its quality without damage of the quality of another fraction. Fractionation can also be employed to even out stock quality fluctuations and would be an alternative to the large blending tanks forming a conventional part of all groundwood mills.

Although the above benefits of fractionation have been known in the paper industry for a long time, no equipment for performing fractionation has hitherto been successfully put into practice. One known method for the fractionation of groundwood pulp using a centrifugal screen has appeared to be efficient for removing a coarse fibre fraction amounting to 10 to 30 per cent of the pulp weight, but is not suitable for dividing groundwood pulp into fractions containing essentially long fibre and fines, respectively. Moreover, the expense of the process in terms of high energy consumption and severe water pollution has been considered too high to justify common industrial use of the process.

The growing pressure for recycling waste products and the use of so-called secondary fibres have made the paper industry look more closely at improved fractionation methods. By fractionating a mixed waste paper pulp, a rearrangement of the different constituents of the raw material can be obtained, whereby the pulp can be separated into fractions containing higher amounts of chemical fibres or groundwood fibres, respectively. Moreover, by fractionating a more uniform waste such as waste corrugated board, the quality of the long fibre fraction will be better than that of the raw material, and refined pulp obtained by such a fractionation may be used for purposes where more expensive pulps are conventionally employed.

The industrial requirements described above have resulted, inter alia, in the so-called Johnson-fractionator which has been described e.g. in the article "Fractionation of Fiber Suspension by Liquid Column Flow" by Gunnar Olgard in the periodical TAPPI, Vol. 53, No. 7, July 1970. In the Johnson fractionator, an assembly of tubes open at each end is used, and the fractionator works with so-called "plugs", i.e. volumes of liquid with suspended matter which are contained between air bubbles. The fractionation is mainly due to two phenomena taking place within such a plug. In pulp flow the wall shear forces will tend to collect the larger particles in the center of the tube. Furthermore, there will be an internal flow pattern in each plug, relative to the mean velocity, there will be a forward flow in the center and a backflow in the wall region.

As a result thereof, the bigger particles will tend to be transported to the front end of the plug, and each plug can be fractionated by separating the front and rear ends at the ejection end of the tubes.

However, the Johnson fractionator has not been successful in practice mainly due to the fact that to secure satisfactory fractionation, the cross section of each tube has to decrease towards the ejection end, whereby the tubes may easily become blocked and prevent the flow of the plugs. Although the operation costs of the Johnson fractionator are not very high, this apparatus still suffers from the same disadvantage as the older centrifugal screen arrangement that only suspensions of a very low concentration can be handled.

SUMMARY OF THE INVENTION

It is the main object of the present invention to provide an improved and economic fractionation method which can be applied to any type of paper pulp suspension, such as groundwood pulp, chemical pulp, waste paper pulp, etc.

According to the invention, a method for separating an aqueous suspension of fibrous particles into fractions of different average characteristics with respect to particle size and shape, comprises the steps of supplying the suspension to a separator disc having a concave surface with a solid matter concentration not exceeding 10 per cent by weight, said separator disc rotating in a substantially horizontal plane at a circumferential velocity sufficiently great that a film of said suspension formed on said concave surface is accelerated towards the disc circumference in a continuous flow, in which fractions of the suspension having said different average characteristics are separated from each other, and at the circumference of the disc said film is broken up and said separated fractions dispersed outwardly from the disc in different directions in a dense mist of particles and atomized water droplets in air, and collecting said fractions in a number of collecting zones disposed in different vertical portions relative to said disc.

The separator disc may be of a construction normally used as atomizer wheel in spray dryers and the like.

As described later, practical experiments have shown that the completely new concept of utilizing atomization technology for the fractionation of liquid suspensions gives excellent results, and the method does not suffer from any of the disadvantages of the known methods. The energy consumption is relatively low, and the separator disc can be constructed to allow the passage of pulp suspensions having a considerably higher fibre concentration than is possible in the other methods. Several fractions can be collected instead of the usual two.

Moreover, the method according to the invention is applicable to other separation processes in addition to the fractionation proper of pulp suspensions according to fibre size and shape. In principle, the same general concept will be usable for the separation of any kind of liquid suspension of solid particles into fractions of different average characteristics. As an obvious example, the method will also be applicable in paper manufacture to carry out a pulp cleaning process as a substitution, for example, for a hydrocyclone or other cleaning equipment, since it opens the possibility of separating fractions consisting mainly of undesired particles, such as sand, shives and splinters, etc.

In practice, separation according to the invention is carried out in a separation system, comprising a chamber having tubular inlet means for feeding said suspension, a separator disc having a concave surface arranged in the upper part of said chamber to receive said suspension from said inlet means on said concave surface and journalled for rotation in a substantially horizontal plane, said separator disc having a diameter greater than that of said inlet means, means for rotating said separator disc at a circumferential velocity sufficiently great that a film of said suspension formed on said concave surface is accelerated towards the disc circumference in a continuous flow, in which fractions of the suspension having said different average characteristics are separated from each other and at the circumference of the disc said film is broken up and separated fractions dispersed outwardly from the disc in different directions in a dense mist of particles and atomized water droplets in air, and
- collecting means arranged in a number of collecting zones disposed in said chamber in different vertical positions to receive said separated fractions.

In a preferred embodiment, the concave side of the separator disc is formed on the underside thereof.

As apparent from the following disclosure, practical experiments have shown that the particular disc configuration mentioned above contributes greatly to the fractionation properties. Also since fractions with different average properties may be collected at different heights relatively close to the circumference of the disc, this particular disc configuration offers the significant advantage of a reduction of the physical size of a commercial fractionation unit.

To make feeding with high consistency pulp possible, i.e. above 1%, the feeding system and the separator disc must be specially designed to prevent fibre blocking. This generally means that the flow must be kept well within the turbulent region. Also, the function of the separator disc will be improved, if the flow can be kept uniform in the feed inlet to the disc.

In some cases, an improved function may be obtained by injecting air into the upper part of the enclosure with a main velocity component directed transversely to the discharge of atomized material from the separator disc.

With respect to paper pulp fractionation, important parameters for optimizing the process have appeared to be the disc configuration, the circumferential velocity of the separator disc, the feed rate of pulp to the disc, i.e. the disc loading and asymmetric versus symmetric distribution on the disc.

BRIEF DESCRIPTION OF THE DRAWINGS

Other objects and advantages of the invention will be apparent from the following description of the application of the method for the fractionation of paper pulp suspension, when read in conjunction with the accompanying drawings, in which FIG. 1 illustrates a pilot plant, on which experiments of fractionation of paper pulp suspensions according to fibre length have been carried out;

FIG. 2 shows an embodiment of a separator disc used in this pilot plant;

FIG. 2A is a schematical illustration of the formation of a suspension film on the separator disc and the separation taking place therein;

FIG. 3 is a number of histograms illustrating the results of a first set of experiments carried out by means of the pilot plant in FIG. 1;

FIG. 4 illustrates another pilot plant, in which further fractionation experiments have been carried out;

FIG. 5 is a graphic representation of the results obtained by experiments carried out in the pilot plant in FIG. 4;

FIG. 6 shows a possible configuration of an industrial plant for fractionating paper pulp by means of the method according to the invention;

FIG. 7 shows a further development of suspension inlet means particularly designed to secure uniform distribution of the supplied suspension;

FIG. 8 shows an alternative embodiment of the separator disc and suspension inlet means;

FIG. 9 shows a still further embodiment of an atomizer wheel incorporating a separator disc.

FIG. 10 shows a modified configuration of collecting cups in a pilot plant, in which still further experiments have been carried out, and FIGS. 11 to 13 are graphic representations illustrating the influence of disc size, disc speed and loading on the fractionation.

DETAILED DESCRIPTION

In the pilot plant illustrated in FIG. 1, a paper pulp suspension in the form of thermomechanical groundwood pulp was supplied through an inlet tube 1 to a separator disc of a construction as shown in FIG. 2, said separator disc being arranged centrally in the upper part of a chamber 3 of the type conventionally used for spray drying purposes. Since the chamber 3 is symmetrical around the vertical axis, only one half of it is shown in FIG. 1.

In the preferred embodiment of the separator disc shown in FIG. 2, the disc is constituted by an upper wall 19 of an atomizer wheel 2 of a construction commonly used for atomization in spray dryers and the like, said upper wall curving slightly downwards from the center of the wheel towards the circumference thereof to form a concave lower surface 19A intersecting the rotating plane of the wheel at an acute angle at its outer circular edge. A drive shaft 20 extending through an opening in the central portion of upper wall 19 is secured to the wheel bottom 21, which is spaced from the upper wall 19 by spacers 22 to allow a film of the suspension supplied through inlet tube 1 to be formed on the lower surface of upper wall 19 and accelerate towards the circumference of said upper wall where it is atomized.

In a first set of experimental investigations, the atomizer wheel 2 was made to rotate at a fairly high circumferential speed, so that atomized material was ejected from the upper wall in a dense mist. Samples of the atomized material were collected in three different zones A, B and C of the enclosure 3 by means of suction samplers 4, 5 and 6, each consisting of a piece of pipe, one end of which was closed and the other end having a wire mesh stretched over it, said suction samplers being connected to a common suction tube and fixed at regular intervals on a rod or shaft 7 allowing the suction samplers to be entered into the chamber 3 with their collection wires approximately normal to the lines joining the separator disc and each sampler.

In the pilot plant an air flow could be made to enter into the chamber 3 through an air inlet 8 in the upper wall thereof around the atomizer wheel 2, so as to have a main velocity component transverse to the discharge of atomized material from the separator disc.

As mentioned above, the first set of experiments were carried out with a fibrous suspension in the form of thermomechanical groundwood pulp. In these experiments the diameter of the pulp inlet tube 1 was 6 mm, whereas the diameter of the separator disc was 120 mm. From each sample collected by suction samplers 4, 5 and 6 in zones A, B and C, respectively of the enclosure 3, three different pulp fractions were obtained by means of a laboratory classifier comprising a 50 mesh screen for retaining a coarse fibre fraction and a 100 mesh screen allowing the passage of a fine fibre fraction, a medium fibre fraction being allowed to pass through the 50 mesh screen and being retained by the 100 mesh screen.

Before entering into a discussion of the results of these experiments which are presented in Table I, it should be mentioned with reference to FIG. 2A that the process carried out is based on the recognition of the fact that separation into fractions of different average characteristics takes place mainly in the suspension film flowing across the concave surface 19A of the separator disc 2 from the center towards the circumference thereof. The exact physical explanation for this separation remains still to be established in detail. However, there is strong indications showing that the separation is due to the following phenomena.

As a result of the centrifugal force from the rotating disc 2 as well as viscous forces in the suspension, high shear gradients are set up in the suspension film 31, since the part of the film closest to the disc surface is accelerated more quickly than the parts near the free surface of the film. These shear gradients are high enough to break down the strong fibre networks which build up in pulp suspensions already at low solid matter concentrations, whereby the larger particles as shown at 32 are caused to migrate away from the immediate vicinity of the disc, whereas fine material as shown at 33 is left behind. This migration effect corresponds in principle to the one described in the foregoing for the Johnson fractionator.

As soon as the suspension film as a whole is accelerated by the disc, the centrifugal forces press the film as a whole against the disc surface due to the concavity thereof. As a result thereof, the larger and denser particles after being accelerated would normally tend to migrate inwards from the free surface of the film towards the disc surface leaving smaller particles behind. However, this secondary effect has appeared to be much smaller than the migration caused by the shear gradients and could, therefor, be neglected.

Therefore, when the film reaches the disc circumference, a particle size and velocity distribution will exist across the film, in which larger and denser particles tend to be primarily concentrated at the free film surface, whereas fine material is left behind closer to the disc surface. At the disc circumference the very fast moving film is no longer subject to the stabilizing effect of the centrifugal force pressing the film against the disc surface and becomes unstable so as to break up when it comes into contact with relatively stationary air on both sides.

In all the experiments in the first set the original groundwood pulp supplied to the pilot plant in FIG. 1 comprised a fine fibre fraction of 65.0 per cent, a medium fibre fraction of 8.0 per cent and a coarse fibre fraction of 27.0 per cent by weight.

In Table I the first and second columns serve to identify the number of the experiment and the three collecting zones A, B and C, respectively. The following columns indicate the various important parameters in the process, such as the feed concentration of the original pulp, the rotational speed of the separator disc and the air flow rate, while the next columns indicate the relative percentage by weight of the fine fibre fraction, the medium fibre fraction and the coarse fibre fraction in the samples collected in zones A, B and C, respectively, in each experiment. These distributions of fibre fractions are also shown in the form of histograms in FIGS. **3*a* to 3*g*, corresponding to the original feed and experiments Nos. 1 to 6**, respectively. The two final columns in Table I indicate the relative amounts of atomized material collected in zones A, B and C in percentages by weight and volume, respectively. It should be remembered that the sampling positions A, B and C were arbitrarily chosen in these experiments, so that the samples B and C which were generally very similar in composition could be considered collectively for purposes of comparison with sample A. The efficiency of the separation process can then best be judged by comparing sample A with the combined samples B and C.

TABLE I

Fractionation of Thermomechanical Groundwood Pulp - Classification by 50 and 100 Mesh Screens

| Exp. No. | Sample | Feed Conc. % | Feed velocity m/s | Disc Speed rpm | Air flow rate kg/h | Fibre classification Fine | Medium | Coarse | Rel. amount % weight | volume |
|---|---|---|---|---|---|---|---|---|---|---|
| Original pulp | | | | | | 65.0 | 8.0 | 27.0 | | |
| 1 | A | 1 | 10.2 | 20,000 | 3200 | 31.0 | 12.0 | 57.0 | 66.4 | |
| | B | 1 | 10.2 | 20,000 | 3200 | 65.0 | 17.0 | 18.0 | 33.6 (B + C) | |
| | C | 1 | 10.2 | 20,000 | 3200 | 65.0 | 17.0 | 18.0 | | |
| 2 | A | 3.0 | 10.0 | 20,000 | 3200 | 37.4 | 3.1 | 59.5 | 77.9 | 65 |
| | B | 3.0 | 10.0 | 20,000 | 3200 | 72.3 | 14.0 | 13.7 | 22.1 (B + C) | 35 (B + C) |
| | C | 3.0 | 10.0 | 20,000 | 3200 | 68.7 | 14.5 | 16.8 | | |
| 3 | A | 4.0 | 11.5 | 20,000 | 3200 | 44.7 | 7.4 | 47.9 | 87.7 | 79 |
| | B | 4.0 | 11.5 | 20,000 | 3200 | 79.8 | 2.0 | 18.2 | 12.3 (B + C) | 21 (B + C) |
| | C | 4.0 | 11.5 | 20,000 | 3200 | 72.8 | 13.2 | 14.0 | | |

TABLE I-continued

Fractionation of Thermomechanical Groundwood Pulp - Classification by 50 and 100 Mesh Screens

| Exp. No. | Sample | Feed Conc. % | Feed velocity m/s | Disc Speed rpm | Air flow rate kg/h | Fibre classification |  |  | Rel. amount % |  |
|---|---|---|---|---|---|---|---|---|---|---|
|   |   |   |   |   |   | Fine | Medium | Coarse | weight | volume |
| 4 | A | 3.3 | 10.5 | 20,000 | — | 36.5 | 9.1 | 54.4 | 71.4 53 |  |
|   | B | 3.3 | 10.5 | 20,000 | — | 61.8 | 19.7 | 18.5 | } 28.6 | } 47 |
|   | C | 3.3 | 10.5 | 20,000 | — | 66.4 | 4.9 | 28.7 |  |  |
| 5 | A | 3.3 | 5.0 | 20,000 | 3200 | 63.1 | 4.6 | 32.3 |  | 65 |
|   | B | 3.3 | 5.0 | 20,000 | 3200 | — | — | — | } | 35 |
|   | C | 3.3 | 5.0 | 20,000 | 3200 | 86.0 | 0 | 14 |  |  |
| 6 | A | 3.3 | 10.5 | 14,000 | 3200 | 35.3 | 7.5 | 57.2 | 90 | 85 |
|   | B | 3.3 | 10.5 | 14,000 | 3200 | 81.3 | 3.2 | 15.5 | } 9.8 | } 15 |
|   | C | 3.3 | 10.5 | 14,000 | 3200 | 71.8 | 6.4 | 21.8 |  |  |

It would appear from the results of experiment No. 5 compared with the results of the other experiments that the feed rate of the original pulp to the atomizer wheel is an important parameter. At the reduced rate used in experiment No. 5, the distribution of the three fractions collected in zone A, in which the greatest amount of atomized material is collected, is not significantly different from the distribution in the original feed, while this is clearly the case in all the other experiments, wherein the percentage of the coarse fibre fraction in the sample collected in zone A is materially greater than in the original feed, while the fine fibre fraction of this sample is less than in the original feed.

With respect to the samples collected in zones B and C, most of the experiments show a significant decrease in the coarse fibre fraction and a corresponding increase in the medium and/or the fine fibre fractions relative to the original feed.

Moreover, it appears from the experiments that the variation of the other parameters indicated in Table I, i.e. the feed concentration, the disc speed and the air flow rate within the limits indicated does not change the efficiency of the fractionation significantly. However, these variables interact in a complex way and could become important, if they changed to the extent that a dense mist was no longer formed in the chamber.

In order to study the distribution more closely and to test the feasibility of the invention for simultaneous separation of sand and fractionation of the fibres, another series of experiments were made.

The pilot plant had the same principal configuration as in experiments 1 to 6 as listed in the foregoing table, but the collection system was more detailed in that samples were taken at eight different levels, such as shown at 23a to h in FIG. 4.

The collection system shown in FIG. 4 differs mainly from the sampling system in FIG. 1 in that the uppermost collecting zone is disposed adjacent to the rotational plane of the separator disc, i.e. opposite the disc circumference, whereas in FIG. 1 the corresponding zone is disposed well below the rotational plane of the disc.

Instead of classifying the samples, differences according to the so-called Schopper-Riegler freeness method (°SR) were used as measures of the efficiency of fractionation. This measuring method has been disclosed in the English language in the publication "Svensk Papperstidning", 68 (1965), 6, 188–191.

The results with a print and ledger cuttings waste pulp are shown in FIG. 5, in which the curve 24 shows that a fine fraction (high SR value) may be collected near the top of the chamber, coarse in the middle and medium to fine near the bottom.

Another series of experiments were made with this equipment and a sedimentation waste pulp at 3% concentration. In this case most of the cellulose was collected in cups 23b, c and d, while the sand was concentrated almost entirely in cups 23d and e.

In summary, it may be concluded from the first set of experiments that separation of pulp into fractions of mutually different average fibre characteristics may be obtained at least up to a concentration of the original pulp of 4 percent by weight of solid matter, which goes far beyond the pulp concentrations which have been fractionable with known equipment. In the actual pilot equipment a small reduction of the disc speed has not appeared to be critical, whereas the feed rate to the disc was an important parameter with unchanged disc speed. However, it seems reasonable to assume that the decreased efficiency at a reduced feed rate could be compensated, at least partly, by a corresponding increase in the disc speed so as to produce a dense mist of atomized material at the actual feed rate. In any case, the circumferential disc speed should be sufficiently great for the formation and acceleration of the suspension film on the concave surface of the disc.

The fact mentioned in the foregoing that the major contribution to the fractionation by the method according to the invention comes from the separator disc has been verified in further experiments showing that pulp fractions of different average characteristics can be obtained very close to the circumference of the separator disc. Thus, by using a wheel of a diameter of 120 mms rotating at a speed of 20,000 r.p.m. and a suspension fed through a feed pipe of 4 mms in diameter at a rate of 11 liters per minute, it has been observed that strong fractionation exists at s horizontal distance of only 66 mms from the circumference of the wheel.

Therefore, as mentioned in the foregoing, it could be concluded that the fractionation is mainly due to the separation taking place in the suspension film flowing across the concave surface of the separator disc and not to ballistic effects from gravity or other forces acting on the constituents of the dense mist dispersed from the circumference of the disc. In the experiments listed in the table, the coarse fraction was collected in the zone at the highest of the three positions A, B and C in FIG. 1. However, it will appear from the graphic representation in FIG. 5 that if the highest zone is closer or adjacent to the rotational plane of the disc, a fine fraction will be collected at the top, a coarse fraction in the middle and medium to the fine near the bottom.

Figure 6:
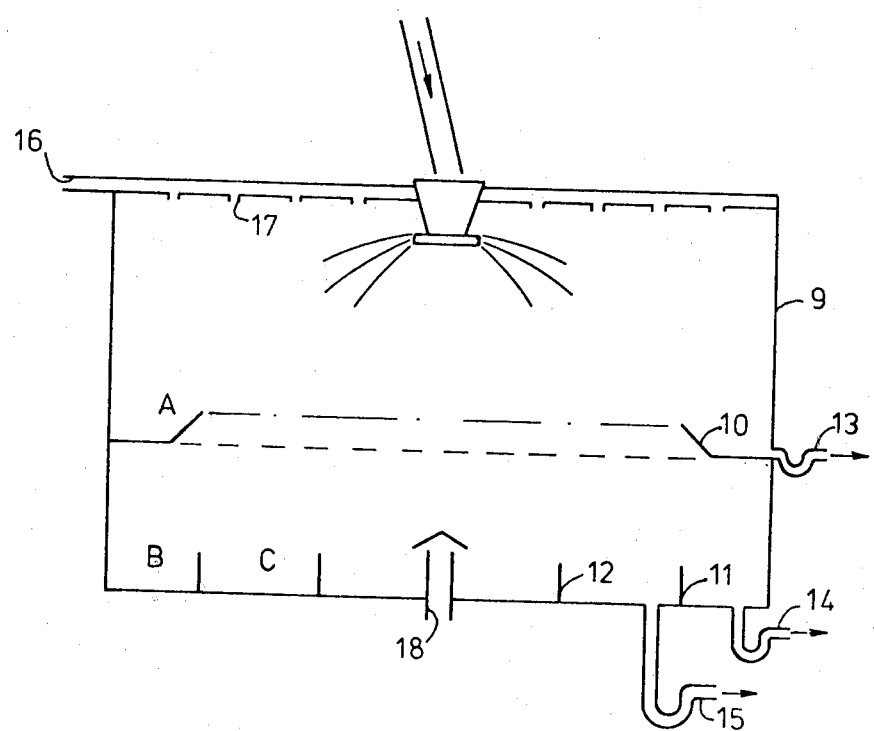

On the basis of the experimental investigations, it will be possible to construct an industrial fractionation plant of the general configuration shown in FIG. 6. In this figure, the chamber 9 is formed with cylindrical side walls and a flat bottom and the zones A, B and C for collecting the pulp fractions of different average characteristics are positioned in annular channels 10, 11 and 12, respectively, one of which is formed on the cylindrical side wall, whereas the others are formed on the flat bottom, each of said fraction channels being connected to a pulp outlet tube 13, 14 and 15, respectively, of such a construction that air supplied into the chamber through an air intake 16 and injection orifices 17 distributed throughout the top wall of the chamber will not be allowed to escape through said outlets, but passes out through a shielded air outlet 18 in the central part of the bottom.

Figure 2:
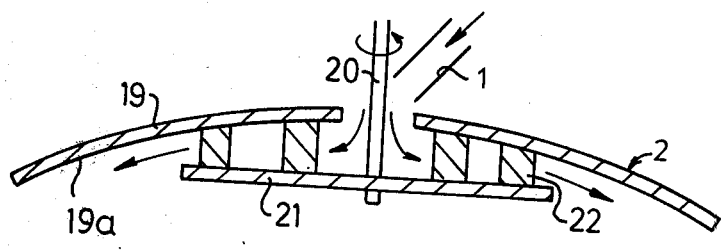
Figure 3:
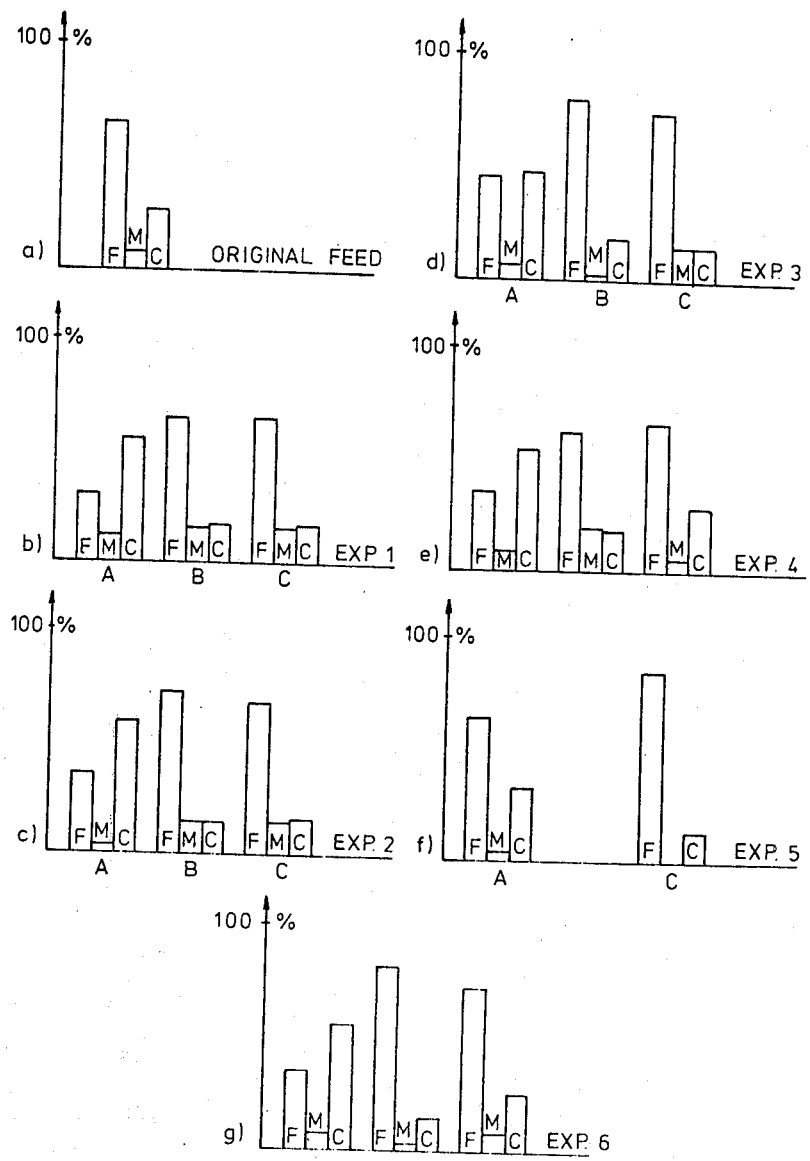

In the practical experiments described hereinbefore, in which a separator disc as shown in FIG. 2 was used together with an inlet tube 1 feeding the suspension through an opening in the central part of the upper wall 19 of the wheel, this inlet tube will necessarily have to be inclined relative to a normal to the rotating plane of the disc owing to the presence of the drive shaft 20. Thereby, the load on the wheel will be asymmetric.

Figure 7:
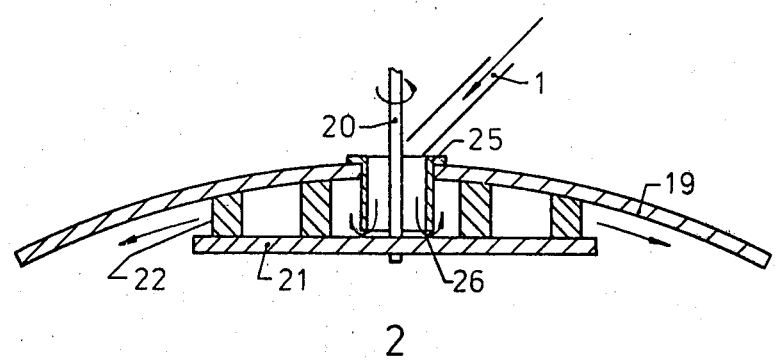

A more uniform distribution of the supplied suspension on the separator disc so as to make the wheel more suitable for an industrial plant as shown in FIG. 6 can be obtained by using inlet means of the construction shown in FIG. 7.

In this figure, a fluid distributor 25 is arranged in the central opening of upper wall 19 of an atomizer wheel which is of the same general configuration as shown in FIG. 2. This fluid distributor consists of a stationary tubular member having top flanges to contact the upper surface of upper plate 19 around the central opening therein, said tubular member being proportioned so as to form a slit 26 between the wheel bottom 21 and the lower end of the tubular member 25 itself.

Figure 8:
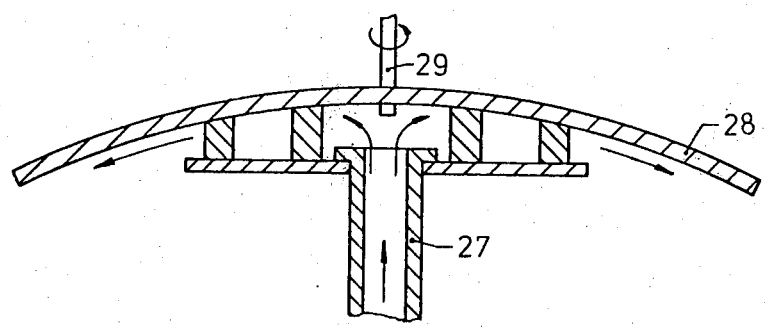

FIG. 8 shows an alternative embodiment of the atomizer wheel with associated inlet means designed to obtain a uniform distribution of the supplied suspension.

In this example, the suspension is supplied through a vertical inlet tube 27 extending through the lower part of the chamber to terminate with its upper end a small distance from the lower side of upper wall 28 of an atomizer wheel of the same general configuration as shown in FIG. 2, but with the drive shaft 29 secured directly to upper wall 28 which has, therefore, not central opening. In this embodiment, the wheel bottom 21 serves the function of retaining the supplied suspension towards the lower side of upper wall 28 so as to secure formation of a suspension film thereon.

The industrial application of the method according to the invention for the fractionation of paper pulp suspensions is not limited to the actual form of equipment shown in FIG. 4, since the form of the enclosure and the collecting channels or zones may readily be modified, which also applies to the particular construction of the atomizing device.

Moreover, within the paper industry the application of the method is not in any way limited to the fractionation per se of any particular pulp. The basic principles of the invention will be applicable, for example, to the fractionation of groundwood pulp, chemical pulp, sediment pulp or waste paper pulp. Furthermore, the method according to the invention will also be applicable to other pulp handling processes, such as pulp cleaning involving the separation of impurity particles, such as sand or splinters from a pulp.

For example, it has been shown by a practical experiment that up to 95 percent of the sand content of a particular waste pulp will be removable together with the majority of coarse shives in the pulp. Furthermore, it has been shown that a pulp cleaned in this way by the method according to the invention may simultaneously with the cleaning be split in a number of fractions ranging from fine to coarse.

Generally, the basic principles of the invention will be applicable not only in the paper industry, but may also be employed for separating liquid suspensions of other fibrous or non-fibrous particles into fractions of different average characteristics.

Thus, an experiment has been carried out with a mineral wool suspension, comprising particles in the form of fibres as well as spherical particles or pearls. In Table II, the results of an experiment carried out with a mineral wool suspension having a total solid matter content of 5 percent by weight in a pilot plant of the same principal configuration as shown in FIG. 4, but having only five collecting cups, are listed. Table II indicates in columns II to V the composition of the supply feed to the separator disc as well as the samples a to d, which were collected in the five cups arranged at different levels ranging from the top to the bottom of the chamber. The percentage values indicated in each of these columns are percentages by weight of the solid matter contents indicated in column I. The percentages indicated in column I for samples a to e are percentages by weight of the solid matter contents of the supply feed.

TABLE II

|  | I Solid matter % | II Spheres exceeding 250$\mu$ % of I | III Spheres exceeding 125$\mu$ % of I | IV Spheres exceeding 63$\mu$ % of I | V Fibres, and spheres smaller than 63$\mu$ % of I |
|---|---|---|---|---|---|
| Supply feed | 0.5 | 10 | 25 | 40 | 60 |
| Sample a | 9.4 | 0.7 | 2.1 | 5.6 | 94.4 |
| b | 27.6 | 0.2 | 0.9 | 8.6 | 91.4 |
| c | 29.9 | 0.3 | 3 | 25 | 75 |
| d | 24.4 | 10.8 | 29 | 76.7 | 23.3 |
| e | 0.6 | 19.1 | 68.1 | 86.2 | 13.8 |

The results show that fibres were concentrated in samples a, b and c, while spherical particles of a diameter exceeding 63$\mu$ were concentrated in samples d and e, primarily in sample d. Thus, the original feed has been separated into fractions consisting mainly of fibres and fractions consisting mainly of spherical particles. In this context it should be observed that in a mineral wool suspension, the fibrous and spherical particles have the same mass density and differ only with respect to their shape. Further experiments carried out with mineral wool suspensions having a solid matter content exceeding 5% have shown that excellent results may be obtained up to a solid matter content of at least 3% and possibly as far as up to 10%.

Thus, it will be apparent from the foregoing that the method and system according to the invention may be successfully employed in various industrial fields for the separation of liquid suspension of solid particles. Of course, the parameters of the process and the construction of the atomizing equipment will have to be selected in accordance with the material to be handled in the particular process.

In the following the results of further investigations of the effects on the fractionation caused by variations in disc size, disc geometry, circumferential speed and disc loading are presented. The separator discs tested in these investigations were all formed by an atomizer wheel of the construction shown in FIG. 9, having a central flat disc portion 34 connected with a drive shaft 35, and a circumferential disc portion 36 formed integrally with the central portion 34, but sloping downwardsly therefrom under en acute angle α to the horizontal plane forming the plane of rotation of the central portion 34. The separation disc 34, 36 was fed with suspension from below through a feed pipe 37. The wheels tested differed only with respect to the disc diameter measured at the outer edge of circumferential portion 32 and the angle α.

For one set of further investigations these two variables and the rotational speed for each experiment or run are listed in Table III. In the experiments, five fractions were collected by means of a modified configuration of collecting cups 38, 39, 40, 41 and 42 shown in FIG. 10. However, the fraction falling into cup 42 was so small that it could not be analyzed, for which reason it was neglected and is not listed in Table III, in which the sixth column identifies fractions A, B and C collected in cups 39, 40 and 41, respectively. In all experiments the collection assembly was positioned with the leading edge of the wall between cups 38 and 39 at a horizontal distance of 455 mms from the edge of the disc 34, 36 in FIG. 9 and a vertical distance of 43 mms above the edge of the disc and the collecting cup assembly was relocated to this position after each wheel change.

The pulp investigated consisted of an equal 50 to 50 percent by weight mixture of a thermomechanical pulp and a sulphate pulp which was chosen to give a wide particle size distribution. The concentration of solid matter in this mixed suspension was 3 percent by weight.

As a classification standard, Canacian Standard Freeness CSF was used which can be taken as a measure of the coarseness of a pulp and is relatively easy and quick to measure. In reality, it is the inverse measure to the drainage resistance of a pulp, but in general it applies that the higher the CSF value, the greater the amount of coarse material, and the smaller the amount of fine material in the pulp. The mixed pulp suspension used in the experiments had a CSF freeness value of 349.

Figure 10:
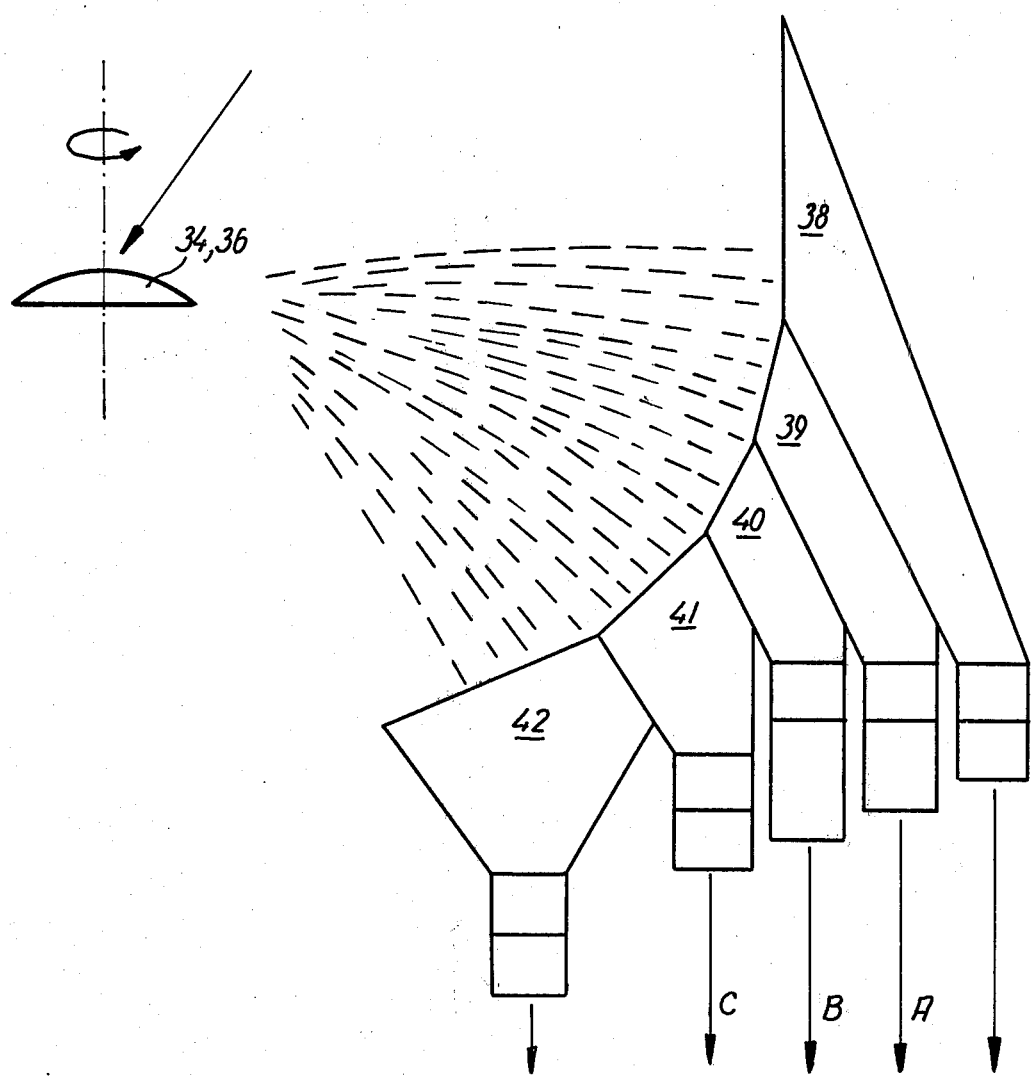

In Table III the CSF value of each of the fractions in each run excluding the fraction in the uppermost cup 38 in FIG. 10, which was too small for a freeness determination, are given in the eighth column. The value P listed in the last column of the table is the sum of the product of the amount of material measured as percentage of total and the CSF freeness value in each fraction, i.e.

P = Σfraction percentage of total X fraction freeness.

TABLE III

Investigation of disc and operating variables

| Run | Disc Diameter mms | Disc Angle α | Rotational Speed r.p.m. | Feed Rate liters/hour | Fraction | Dry Matter Percentage of Total | CSF Freeness | P |
|---|---|---|---|---|---|---|---|---|
| 1 | 150 | 60 | 20.000 | 520 | A | 17.3 | 196 | 39520 |
|   |     |    |        |     | B | 75.6 | 457 |       |
|   |     |    |        |     | C | 6.5  | 243 |       |
| 2 | 150 | 60 | 20.000 | 950 | A | 5.8  | 67  | 39230 |
|   |     |    |        |     | B | 82.7 | 427 |       |
|   |     |    |        |     | C | 11.2 | 315 |       |
| 3 | 150 | 60 | 20.000 | 1500 | A | 2.2 |     | 37330 |
|   |     |    |        |      | B | 52.3 | 337 |      |
|   |     |    |        |      | C | 45.3 | 435 |      |
| 4 | 150 | 60 | 12.000 | 520 | A | 12.4 | 98  | 36266 |
|   |     |    |        |     | B | 74.7 | 395 |       |
|   |     |    |        |     | C | 12.6 | 440 |       |
| 5 | 150 | 60 | 12.000 | 950 | A | 5.8  |     | 37194 |
|   |     |    |        |     | B | 51.5 | 336 |       |
|   |     |    |        |     | C | 42.5 | 468 |       |
| 6 | 150 | 30 | 20.000 | 520 | A | 43.1 | 167 | 32767 |
|   |     |    |        |     | B | 42.8 | 461 |       |
|   |     |    |        |     | C | 13.3 | 439 |       |
| 7 | 150 | 30 | 20.000 | 950 | A | 9.4  | 16  | 37650 |
|   |     |    |        |     | B | 65.7 | 417 |       |
|   |     |    |        |     | C | 24.7 | 409 |       |
| 8 | 150 | 30 | 12.000 | 520 | A | 23.9 | 107 | 36803 |
|   |     |    |        |     | B | 49.7 | 461 |       |
|   |     |    |        |     | C | 24.8 | 457 |       |
| 9 | 210 | 30 | 14.300 | 520 | A | 61.9 | 321 | 36502 |
|   |     |    |        |     | B | 20.9 | 374 |       |
|   |     |    |        |     | C | 17.1 | 533 |       |
| 10 | 210 | 30 | 14.300 | 730 | A | 58.9 | 331 | 37669 |
|    |     |    |        |     | B | 20.6 | 376 |       |
|    |     |    |        |     | C | 19.6 | 532 |       |
| 11 | 210 | 30 | 14.300 | 1500 | A | 27.6 | 177 | 35644 |
|    |     |    |        |      | B | 46.2 | 413 |       |
|    |     |    |        |      | C | 24.9 | 469 |       |
| 12 | 210 | 30 | 16.900 | 730 | A | 49.1 | 317 | 36152 |
|    |     |    |        |     | B | 30.1 | 377 |       |
|    |     |    |        |     | C | 17.4 | 531 |       |
| 13 | 400 | 30 | 6.600 | 520 | A | 65.7 | 355 | 36176 |
|    |     |    |       |     | B | 9.5  | 507 |       |
|    |     |    |       |     | C | 14.8 | 543 |       |
| 14 | 400 | 30 | 3.600 | 1380 | A | 48.2 | 221 | 36753 |
|    |     |    |       |      | B | 18.6 | 502 |       |

TABLE III-continued

| | Disc Diameter mms | Disc Angle α | Rotational Speed r.p.m. | Feed Rate liters/hour | | Dry Matter Percentage | CSF | |
|---|---|---|---|---|---|---|---|---|
| Run | | | | | Fraction | of Total | Freeness | P |
| | | | | | C | 32.3 | 519 | |

Despite the considerable variations in the experimental conditions, in the freeness values of the individual fractions collected and in the amount of material in each fraction, the value of P is relatively constant which means that the area under a freeness versus material distribution curve will be approximately the same, no matter how a given pulp is split up into different fractions. This is a very useful result, since such a curve can be used to evaluate the separation achieved even though a change of experimental conditions modifies the height and spread of the dense mist or cloud of dispersion adjacent to the wheel. Thus, it is not necessary to adjust the relative position of the collection cups to obtain an equal amount of material in each fraction in two runs conducted under different experimental conditions in order to evaluate and compare the composition of each fraction.

Figure 11:
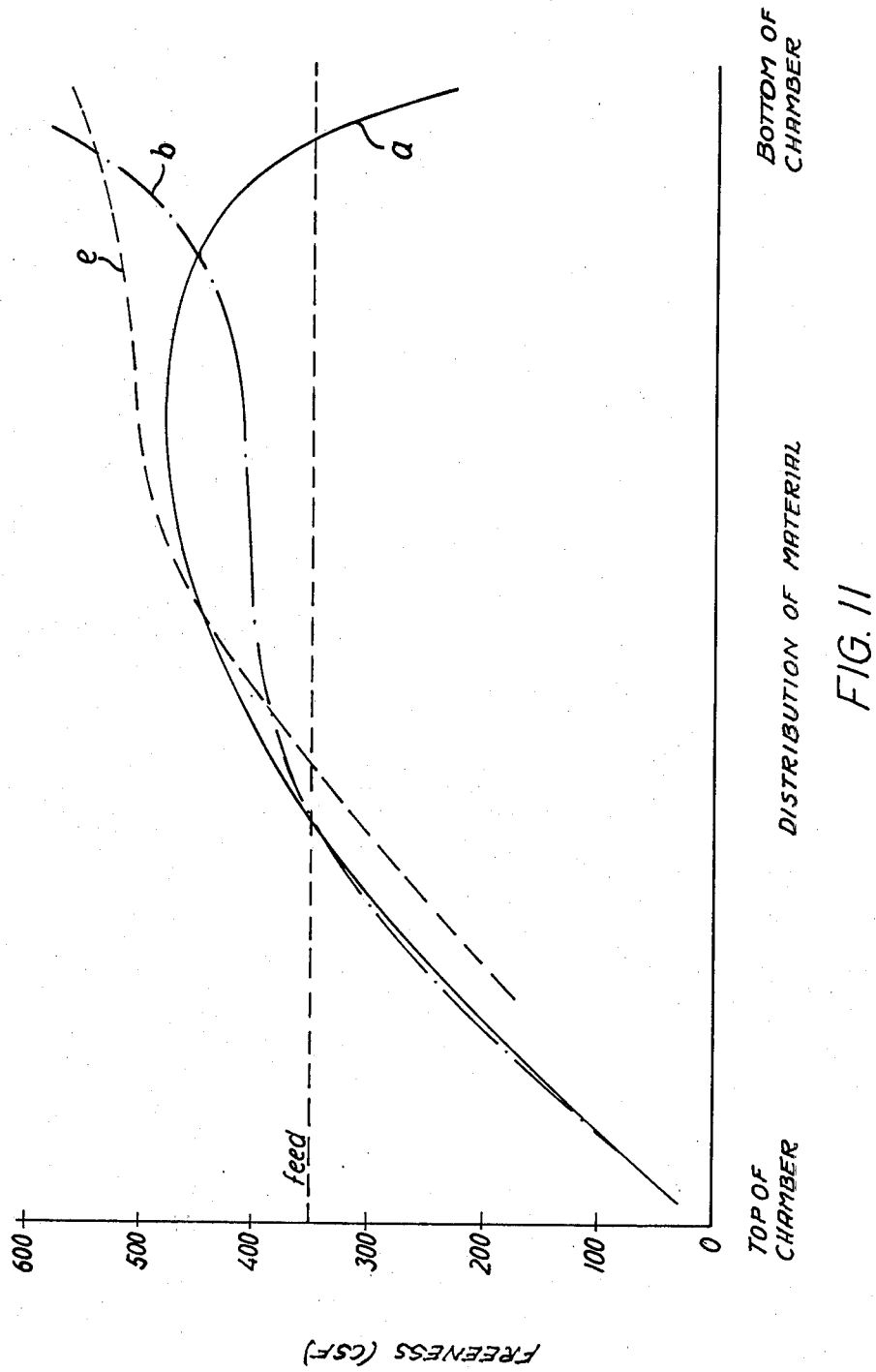

In FIG. 11 all the data obtained for each disc diameter are presented by curves a, b and c for diameters of 150 mms, 210 mms and 400 mms, respectively, showing CSF freeness value versus material distribution from the top of the chamber at collecting cup 39 to the bottom of the chamber at collecting cup 41. As shown in Table III, despite the large variation in other variables, such as feed rate, rotational speed and angle α, the CSF freeness values are quite well correlated on a single curve for each disc diameter, whereas the distribution varies considerably for the three diameters.

The smallest disc having a diameter of 150 mms produces a dense mist dispersion which is rich in fine material, i.e. low CSF value, at the top of the chamber and rich in coarse material, i.e. high CSF value, in the middle of the chamber with a return to intermediate values at the bottom of the chamber. This result is consistent with the one depicted in FIG. 5 for a disc diameter of 120 mms.

For the next disc diameter of 210 mms, the downturn in the curve at the bottom of the chamber has been eliminated. Apparently, this is due to the fact that residence time for the fibrous particles migrating in the film flow on the disc has been increased by the higher diameter permitting the coarser or larger particles to migrate to the outer surface of the film and displace some fine material towards the disc surface. With this wheel a fraction having a CSF freeness value above 500 can be obtained.

This tendency is even more pronounced for the largest disc diameter of 400 mms. With this disc the CSF value increases continuously from nearly 200 at the top of the chamber to about 600 at the bottom, indicating that a further increase of the disc diameter could give a practically linear distribution of CSF values from 200 to about 700.

This is a clear evidence that better separation is achieved with larger disc diameter. Furthermore, it appears from the figures in Table III that the spread of the dispersed mist in the vertical direction increases with increasing disc diameter which leads to the important result that the opening to a particular collection cup can be made wider in order to collect a certain percentage of the material. This in turn leads to easier pulp handling and a smaller fractionation system.

In the set of experiments discussed in the foregoing, disc loading and rotational speed were chosen to allow comparison of different disc diameters at equal film thicknesses at the disc circumference, equal circumferential velocity and equal centrifugal force. Therefore, the effect of changes in disc loading and rotational speed in this set of experiments are not so well defined.

Figure 9:
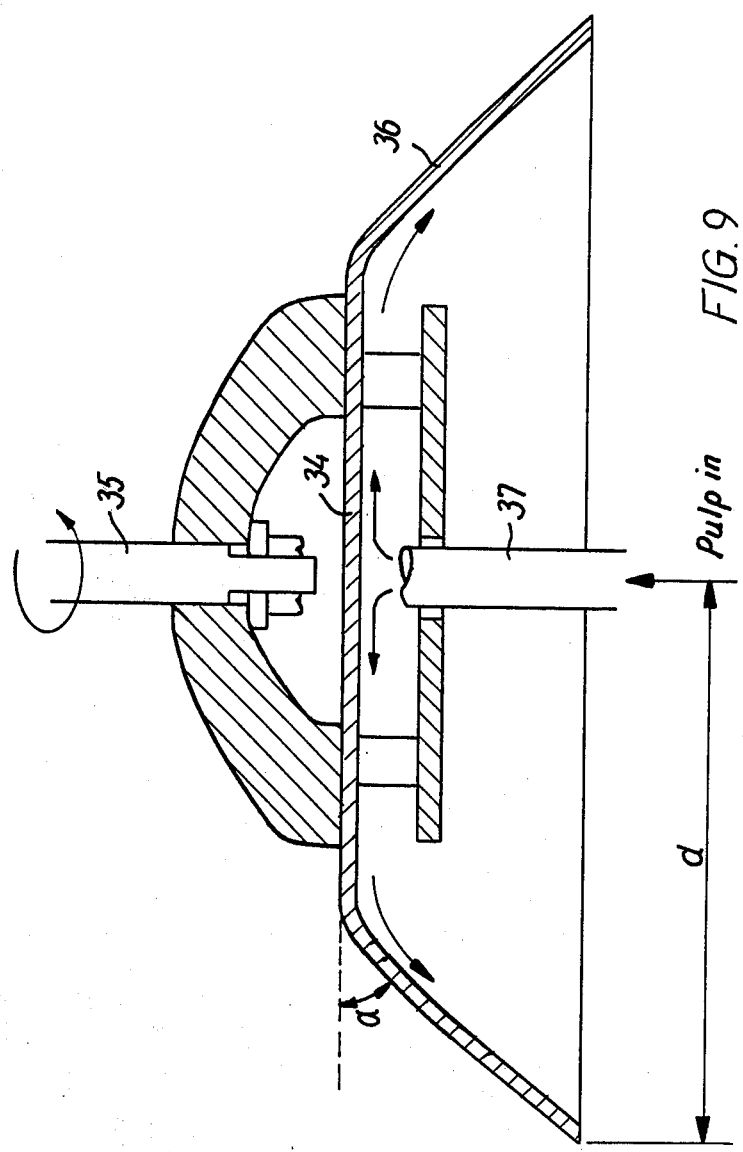

With respect to the disc angle α in FIG. 9, it will appear from the table that the lower magnitude 30° of this angle gives better results in respect of separation as well as spread of dispersion.

Although not clearly verified in this investigation, the degree of separation can be expected to decrease somewhat with increased disc loading, since the film thickness on the disc increases when suspension is supplied at a higher flow rate resulting in a longer migration path for the fibrous particles and smaller shear forces in the part of the film close to the free surface.

Moreover, it is certain although not verified in this investigation that there will be a lower limit for the disc speed. However, the investigation shows that a wide range of disc speeds will give a good separation which is important when energy consumption is considered. For example, with respect to runs 1 and 4 in Table III, it should be mentioned that with a reduction of the disc speed from 20,000 to 12,000 r.p.m., energy consumption will decrease considerably without any significant decrease of the fractionation capability. The same will appear from a comparison of runs 2 and 5.

The important effect of the disc size has been further investigated in a set of experiments with two large disc atomizer wheels having diameters of 550 mms and 750 mms, respectively. The main purpose of these experiments was to investigate the degree of separation obtained for a standard pulp suspension consisting of an equal mixture of thermomechanical pulp and softwood craft pulp with a CSF freeness value of 350 and a feed concentration of solid matter of 3 per cent.

For these experiments a new collection assembly having wider collection cups were used, so that a larger proportion of the fractionated pulp could be collected for analysis. The dimensions of the cup assembly in the plane of the disc drive axis were unchanged from the configuration shown in FIG. 10, and the cups were positioned so that the dividing wall between cups 38 and 39 were at a horizontal distance of 455 mms from the disc edge and at a vertical distance of 43 mms above the disc edge.

The wheels were constructed as shown in FIG. 9, apart from the fact that even distribution of the supplied pulp suspension onto the disc was obtained by means of a small wheel fixed in the middle of the underside of the central disc portion. The disc angle α was 30°, and the suspension was supplied from below through a 12 mm feed pipe.

As a numerical value of the degree of separation, the difference in CSF values between equally large fractions divided by the freeness of the feed material has been used, i.e.

$$\Delta = \frac{CSF(75\%) - CSF(25\%)}{CSF(feed)}$$

It should be noted, however, that this measure is not directly applicable to pulps differing greatly from the standard pulp mix used in this investigation.

The results of the experiments appear in Table IV, in which the value of Δ for each experiment or run is given in the last column. The higher the value of Δ, the better the separation.

The experiments in this investigation were conducted at different speeds and disc loadings and for each run the specific power consumption in turns of kWh per ton solid matter in the suspension is indicated. This figure will increase with increasing disc speed and decreasing loading, and normally the separation degree will increase with increasing specific power consumption. However, using the Δ measure as a criterion for separation degree, it will appear that good separation can be achieved for relatively moderate values of specific power consumption which, of course, is important for industrial use of the method according to the invention.

TABLE IV

| Run | Disc Diameter mms | Rotational Speed r.p.m. | Loading liters/hour | Spec. Power Consumption kWh/ton | Δ |
|---|---|---|---|---|---|
| 1 | 550 | 6700 | 1889 | 261 | 0.86 |
| 2 | — | 5900 | 3861 | 135 | 0.77 |
| 3 | — | 5050 | 3361 | 125 | 0.86 |
| 4 | — | 4200 | 5736 | 66 | 0.69 |
| 5 | — | 3400 | 6347 | 50 | 0.69 |
| 6 | — | 2550 | 8889 | 29 | 0.51 |
| 7 | — | 1700 | 11111 | 13 | 0.29 |
| 8 | — | 1700 | 7403 | 12 | 0.34 |
| 9 | — | 1700 | 2542 | 15 | 0.57 |
| 10 | — | 3400 | 2917 | 54 | 0.94 |
| 11 | 750 | 5650 | 1333 | 217 | 0.60 |
| 12 | — | 4200 | 1569 | 191 | 0.74 |
| 13 | — | 3400 | 2111 | 125 | 0.97 |
| 14 | — | 2550 | 3708 | 57 | 0.89 |
| 15 | — | 1700 | 6278 | 26 | 0.60 |
| 16 | — | 850 | 14222 | 4,6 | 0.46 |
| 17 | — | 3400 | 875 | 144 | 0.97 |
| 18 | — | 1700 | 2819 | 29 | 0.74 |

Figure 12:
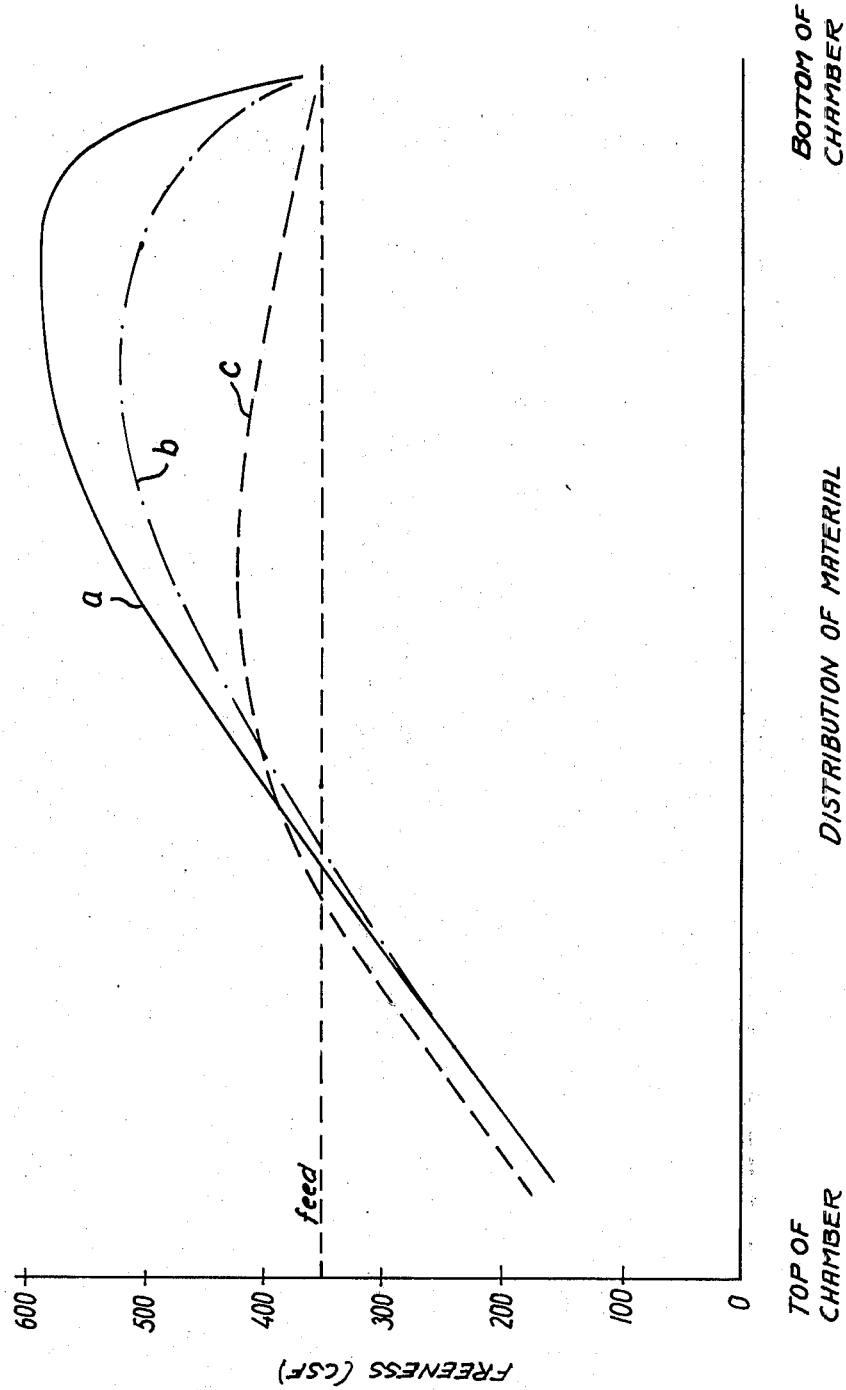
Figure 13:
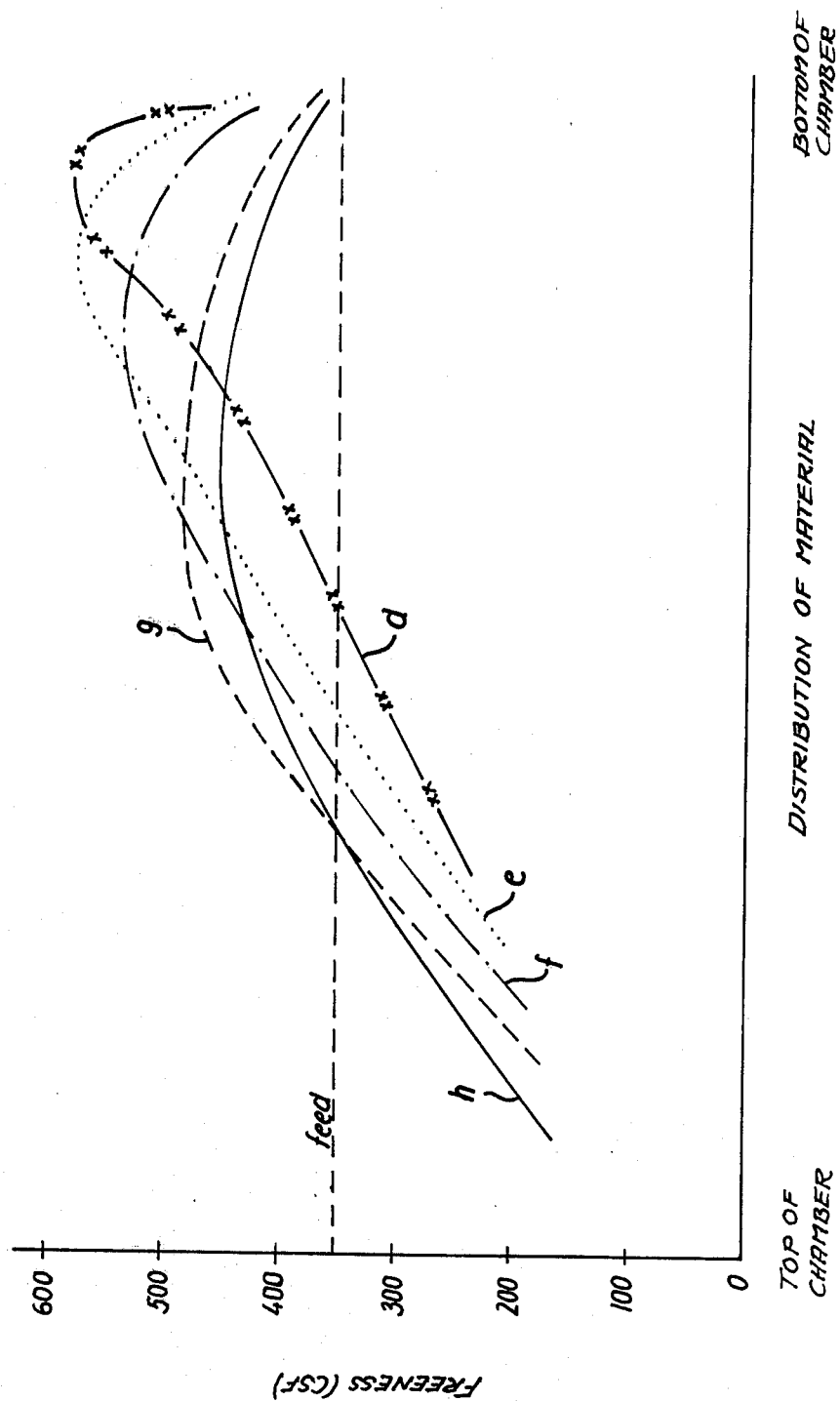

In FIGS. 12 and 13 curves are shown illustrating the performance of the two discs having diameters of 550 mms and 750 mms, respectively, at different disc speeds and loadings, curves a, b and c in FIG. 12 corresponding to runs 1, 5 and 7 in Table IV, and curves d, e, f, g and h in FIG. 13 to runs 12, 13, 14, 15 and 16 in Table IV.

It will appear from the figures that the greater disc diameter gives a better separation at the same loading, and that this can be obtained at a lower specific power consumption, compare runs 7 and 16 and runs 1 and 13. Therefore, the larger disc clearly appears to be superior.

A particularly interesting experiment is run 16 in Table IV, in which a significant separation was achieved at a very low speed, a reasonably high loading and a low specific energy consumption.

Using this experiment, it can be established that with a suitable disc diameter, excellent separation can be achieved with a circumferential velocity of the disc as low as 33 m/sec.

Also run 11 is interesting by demonstrating that a good separation can be obtained at a rather low volumetric feed flow rate for a given wheel. On the basis of this experiment it can be calculated that good results are obtained for a value of the ratio of volumetric flow rate to disc circumference as low as 1.5 cm²/sec.

However, these numeric examples serve only to demonstrate the efficiency of the method according to the invention over a wide range of operating parameters and should not be considered absolute minimum values. Moreover, the two quanties circumferential disc speed and ratio of volumetric flow rate to disc circumference are interrelated, since for a given wheel rotating at the numerical value of circumferential disc speed calculated from run 16, the volumetric feed rate must be higher than calculated from the above mentioned numeric value of the ratio, and if the volumetric flow rate is low corresponding to the numeric value of said ratio, the disc speed will have to be higher than the numerical value indicated.

What is claimed is:

1. A method for separating an aqueous suspension containing fibrous particles into fractions of different average characteristics with respect to particle size and shape, comprising the steps of supplying the suspension to a separator disc having a concave surface with a solid matter concentration not exceeding 10 percent by weight, said separator disc rotating in a substantially horizontal plane at a circumferential velocity sufficiently great that a film of said suspension formed on said concave surface is accelerated towards the disc circumference in a continuous flow in which fractions of the suspension having said different average characteristics are separated from each other and at the circumference of the disc said film is broken up and said separated fractions dispersed outwardly from the disc in different directions in a dense mist of particles and atomized water droplets in air, and collecting said fractions in a number of collecting zones disposed in different vertical portions relative to said disc.

2. A method as claimed in claim 1, wherein said suspension is supplied to said separator disc with a minimum concentration of 0.5 percent by weight.

3. A method as claimed in claim 1, wherein said suspension is supplied to said separator disc in a flow well within the turbulent region.

4. A method as claimed in claim 1, wherein said separator disc is rotated at a circumferential velocity of at least 33 m/sec.

5. A method as claimed in claim 1, wherein the ratio of the volumetric flow rate of said suspension feed to the circumference of said separator disc is at least 1.5 cm²/sec.

6. A method as claimed in claim 1, wherein said concave surface is formed on the underside of said disc.

7. A method as claimed in claim 1, wherein one of said fractions is collected in a zone adjacent the rotational plane of the disc.

8. A system for separating an aqueous suspension containing fibrous particles into fractions of different average characteristics with respect to particle size and shape, comprising a chamber having tubular inlet means for feeding said suspension, a separator disc having a concave surface on the underside of said disc and arranged for rotation in a substantially horizontal plane in the upper part of said chamber to receive said suspension from said inlet means, said separator disc having a diameter greater than that of said inlet means and sloping downwardly from a central portion of the disc towards the circumference thereof, means for rotating said separator disc at a circumference velocity sufficiently great that a film of said suspension formed on the underside of the disc is accelerated towards the disc circumference in a continuous flow, in which fractions of the suspension having said different average characteristics are separated from each other and at the circumference of the disc said film is broken up and separated fractions dispersed outwardly from the disc in different directions in a dense mist of particles and atomized water droplets in air, and collecting means arranged in a number of collecting zones disposed in said chamber in different vertical positions to receive said separated fractions.

9. A system as claimed in claim 8, wherein said collecting means are distributed from an upper collecting zone adjacent the rotational plane of said separator disc to a lower collecting zone closer to the bottom of said chamber.

10. A system for separating aqueous suspension containing fibruos particles into fractions of different average characteristics with respect to particle size and shape, comprising a chamber having tubular inlet means for feeding said suspension, a separator disc having a concave surface formed on the underside thereof and arranged for rotation in a substantially horizontal plane in the upper part of said chamber to receive said suspension from said inlet means, said separator disc having a diameter greater than that of said inlet means, means for rotating said separator disc, said rotating means imparting a circumferential velocity to said separator disc so that a film of said suspension supplied through said inlet means forms on said concave surface and is accelerated by centrifugal forces in a continuous flow with fractions of the suspension having said different average characteristics separated from each other towards the circumference of the disc and broken up at said disc circumference to thereby disperse separated fractions outwardly from the disc in different directions in a dense mist of particles and atomized water droplets in air, and collecting means arranged in a number of collecting zones disposed in said chamber in different vertical positions to receive said separated fractions.

11. A system as claimed in claim 8 or 10, wherein said separator disc is formed by the upper wall of an atomizer wheel extending downwards from the centre of the wheel towards the circumference thereof to form an acute angle with the rotating plane of the wheel.

12. A system as claimed in claim 11, wherein said inlet means comprises a fluid distributor in the form of a stationary tubular member arranged in a central opening in the upper wall of the atomizer wheel to allow rotation thereof, a drive shaft of said wheel extending through said tubular member, the atomizer wheel further comprising a wheel bottom connected with said drive shaft and spaced from said upper wall to form a narrow slit between said wheel bottom and the lower end of said tubular member itself to allow substantially uniform introduction of said suspension from said tubular member and distribution thereof between said wheel bottom and said upper wall throughout the circumference of the slit.

13. A system as claimed in claim 11, wherein said inlet means comprises a feed tube extending upwards through said chamber in a substantially vertical direction coaxially with said atomizer wheel to terminate with its open upper end a small distance below the lower surface of said upper wall.

14. A system for separating aqueous suspension containing fibrous particles into fractions of different average characteristics with respect to particle size and shape, comprising a chamber having tubular inlet means for feeding said suspension, a separator disc having a concave surface, a flat central portion arranged for rotation in a horizontal plane, and a circumferential portion formed integral with said central portion and sloping downwardly therefrom under an acute angle to said rotational plane, said disc arranged for rotation in a substantially horizontal plane in the upper part of said chamber to receive said suspension from said inlet means, said separator disc having a diameter greater than that of said inlet means, means for rotating said separator disc, said rotating means imparting a circumferential velocity to said separator disc so that a film of said suspension supplied through said inlet means forms on said concave surface and is accelerated by centrifugal forces in a continuous flow with fractions of the suspension having said different average characteristics separated from each other towards the circumference of the disc and broken up at said disc circumference to thereby disperse separated fractions outwardly from the disc in different directions in a dense mist of particles and atomized water droplets in air, and collecting means arranged in a number of collecting zones disposed in said chamber in different vertical positions to receive said separated fractions.

15. A system as claimed in claim 8 or 14, wherein the diameter of said disc measured at the outer edge of the sloping circumferential portion is at least 120 mms.

16. A system as claimed in claim 14 wherein said acute angle does not exceed 60°.

17. A system as claimed in claim 16, wherein said angle is 30°.

* * * * *